T. E. MURRAY.
HUB FOR METAL VEHICLE WHEELS.
APPLICATION FILED MAY 29, 1916.

1,206,889.

Patented Dec. 5, 1916.

Inventor
Thomas E. Murray
By his Attorney

UNITED STATES PATENT OFFICE.

THOMAS E. MURRAY, OF NEW YORK, N. Y.

HUB FOR METAL VEHICLE-WHEELS.

1,206,889.   Specification of Letters Patent.   Patented Dec. 5, 1916.

Application filed May 29, 1916. Serial No. 100,577.

*To all whom it may concern:*

Be it known that I, THOMAS E. MURRAY, a citizen of the United States, residing at New York, in the county of New York and State of New York, have invented a certain new and useful Improvement in Hubs for Metal Vehicle-Wheels, of which the following is a specification.

The invention relates to a hub for metal vehicle wheels, and consists in the construction of said hub, whereby the same is simplified and cheapened.

Figures 1, 3:
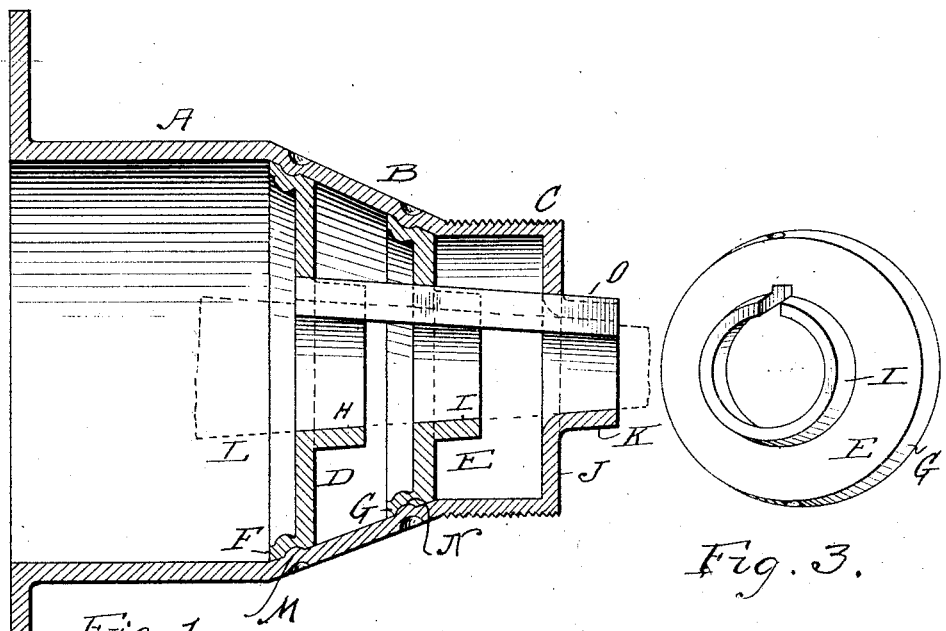
Figure 2:
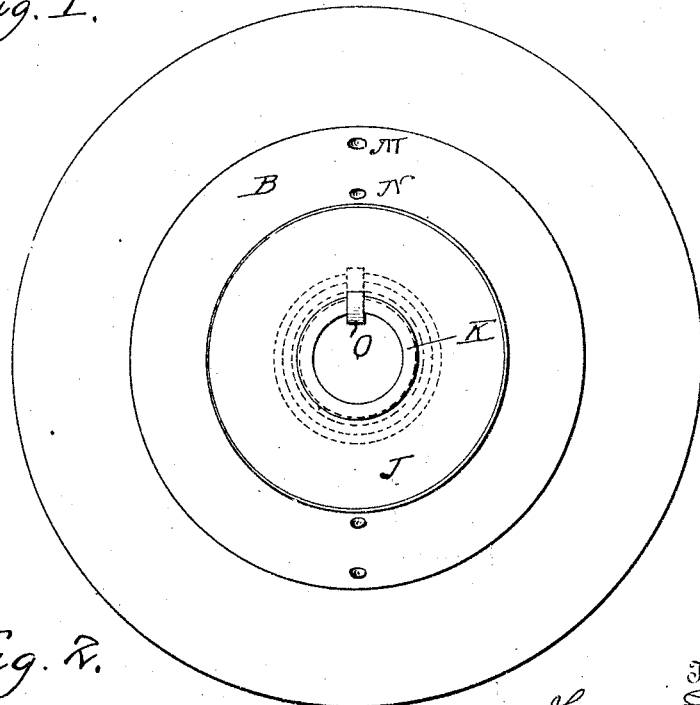

In the accompanying drawings, Figure 1 is a longitudinal section of my hub. Fig. 2 is a front elevation. Fig. 3 is a perspective view of one of the annular disks.

Similar letters of reference indicate like parts.

The hub shell comprises a cylindrical wheel-receiving portion A, an outwardly tapered portion B, and a cylindrical threaded portion C for the reception of the usual threaded screw cap. Within the tapered portion B are seated two annular disks D, E, having circumferential flanges F, G, and outwardly turned inner flanges H. I surrounding their central openings. The outer wall J of the hub shell has a central opening provided with an outwardly turned flange K. The flanges H, I, K are tapered to diminish gradually in diameter in order to receive a correspondingly tapered axle L, dotted lines Fig. 1.

The disks D, E are of different diameters so as to be seated preferably at opposite ends of the tapered hub portion B. They may be secured in place by struck up projections M, N on the shell entering recesses in flanges F, G. If desired, the disk flanges may be united to the shell also by welding; or the projections and recesses may be omitted, and the union of disks and shell effected by welding only.

In order to secure the axle to the shell, I form in the disks D, E and outer wall J, and in the flanges H, I, K thereon, a keyway which is adapted to receive a key O constructed to enter a suitable longitudinal slot in the axle.

I claim:

1. A metal hub for vehicle wheels, comprising a shell having a cylindrical wheel-receiving portion, an outwardly tapered portion and an end wall having an opening, and an outwardly turned flange surrounding said opening, a plurality of annular disks of different diameters seated in said tapered hub portion, and outwardly turned flanges on said disks surrounding the openings therein, the said disk and wall flanges being in line.

2. A metal hub for vehicle wheels, comprising a shell having a cylindrical wheel-receiving portion, an outwardly tapered portion and an end wall having an opening, and a tapered flange surrounding said opening, a plurality of annular disks of different diameters seated in said tapered hub portion, and outwardly tapered flanges on said disks surrounding the openings therein, the said disk and wall flanges being in line and of successively diminishing diameters.

3. A metal hub for vehicle wheels, comprising a shell having a cylindrical wheel-receiving portion, an outwardly tapered portion and an end wall having an opening, and an outwardly turned flange surrounding said opening, a plurality of annular disks of different diameters seated in said tapered hub portion, and outwardly turned flanges on said disks surrounding the openings therein, the said disk and wall flanges being in line; there being a key-way formed in said disk and wall flanges adapted to receive a key for securing an axle in said flanges.

In testimony whereof I have affixed my signature in presence of two witnesses.

THOMAS E. MURRAY.

Witnesses:
 GERTRUDE T. PORTER,
 MAY T. McGARRY.